United States Patent [19]
Satzler

[11] Patent Number: 5,803,807
[45] Date of Patent: Sep. 8, 1998

[54] SUPPORTING SYSTEM FOR A ROTATING CONCAVE GRAIN THRESHING MECHANISM

[75] Inventor: Ronald L. Satzler, Princeville, Ill.

[73] Assignee: Caterpillar Inc., Peoria, Ill.

[21] Appl. No.: 757,389

[22] Filed: Nov. 27, 1996

[51] Int. Cl.$^6$ ................................................. A01F 12/56
[52] U.S. Cl. ............................ 460/69; 460/80; 460/119
[58] Field of Search ........................... 460/107, 66, 68, 460/69, 80, 119, 150

[56] References Cited

U.S. PATENT DOCUMENTS

| | | |
|---|---|---|
| 240,362 | 4/1881 | Barnard . |
| 2,906,270 | 9/1959 | Buchele . |
| 3,103,932 | 9/1963 | Buchele . |
| 3,425,423 | 2/1969 | McKenzie . |
| 4,198,802 | 4/1980 | Hengen et al. ........................ 56/14.6 |
| 4,230,130 | 10/1980 | Staiert ................................... 460/69 X |
| 4,274,426 | 6/1981 | Williams . |
| 4,284,086 | 8/1981 | Williams . |
| 4,489,733 | 12/1984 | Underwood . |
| 4,957,467 | 9/1990 | Zachary ................................... 460/69 |
| 5,562,540 | 10/1996 | Balmer ................................. 460/68 X |

*Primary Examiner*—Terry Lee Melius
*Attorney, Agent, or Firm*—Kenneth A. Rhoads

[57] ABSTRACT

A grain threshing mechanism has a concave assembly and rotor assembly positioned within the concave assembly. The concave assembly has a concave receiving end portion, a concave middle portion, and a concave discharge end portion. A supporting system supports and maintains the concave assembly substantially coaxially aligned with the rotor assembly. The concave receiving end portion is in contact with the supporting means and the concave middle portion and the concave discharge end portions of the concave assembly are cantilevered and free from supporting means and discharge end obstruction.

13 Claims, 3 Drawing Sheets

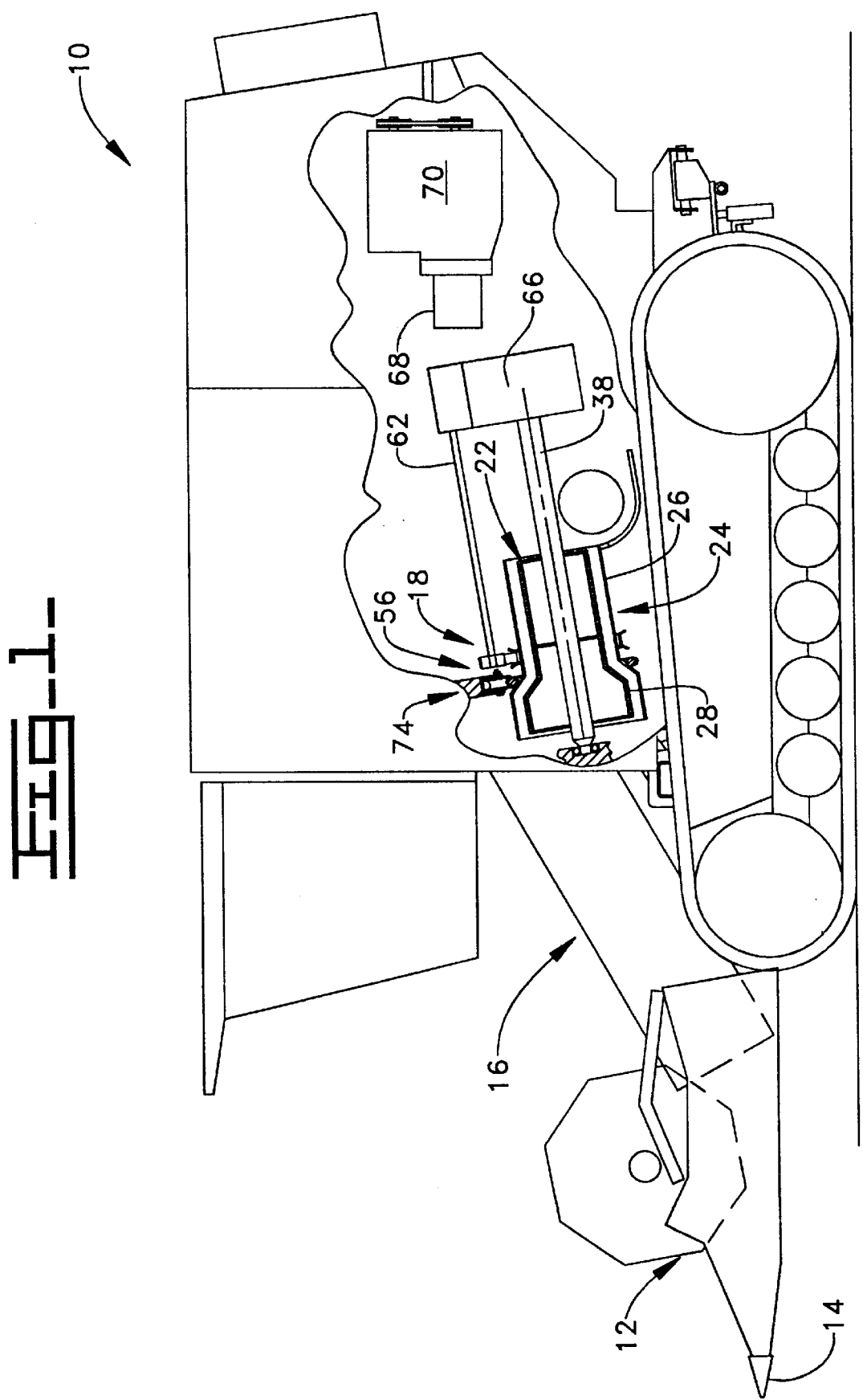

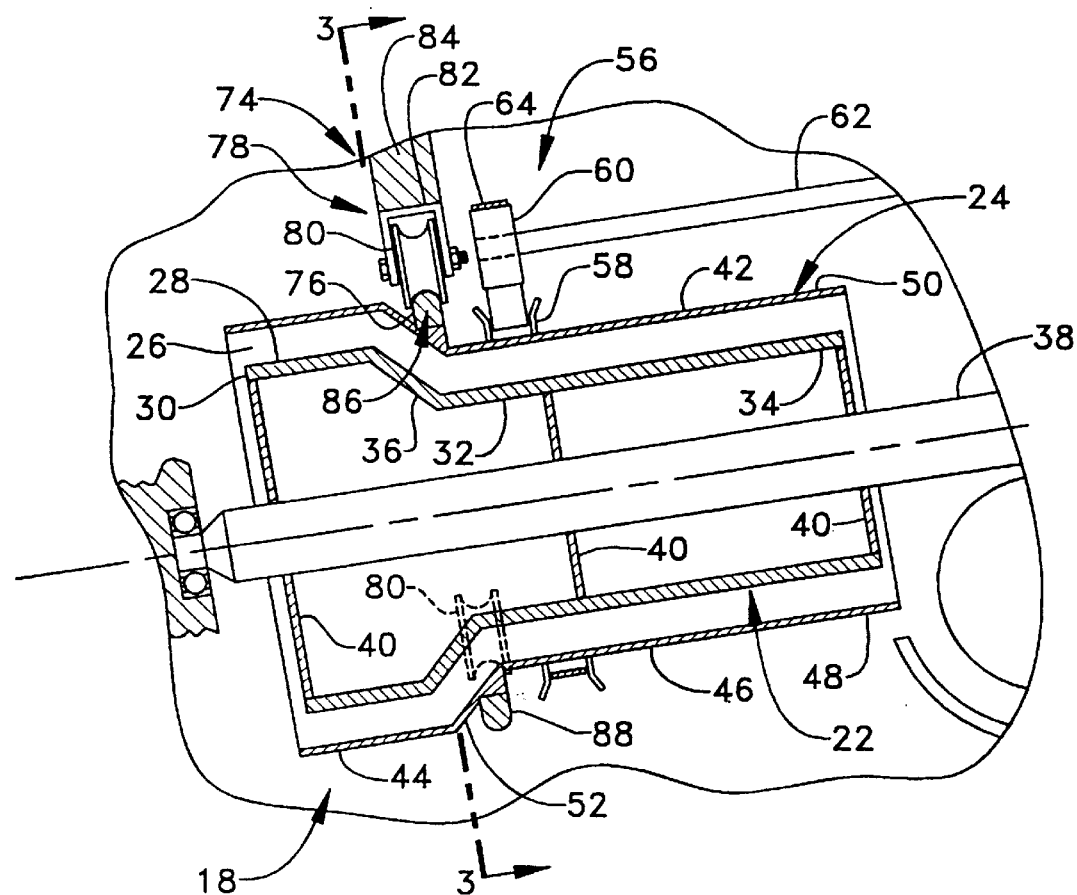
Fig_2_
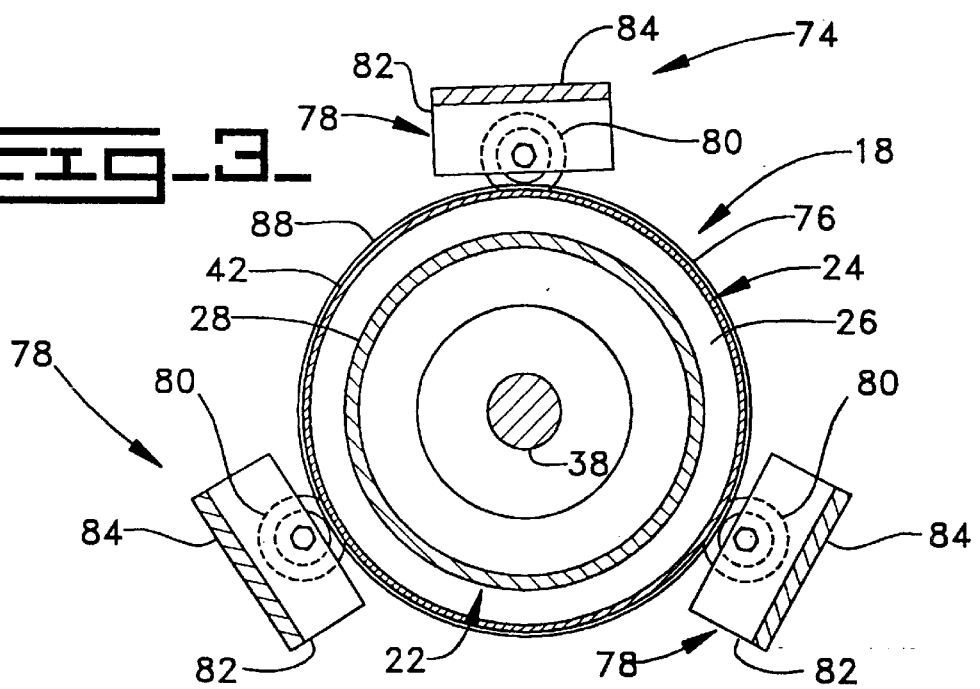
Fig_3_

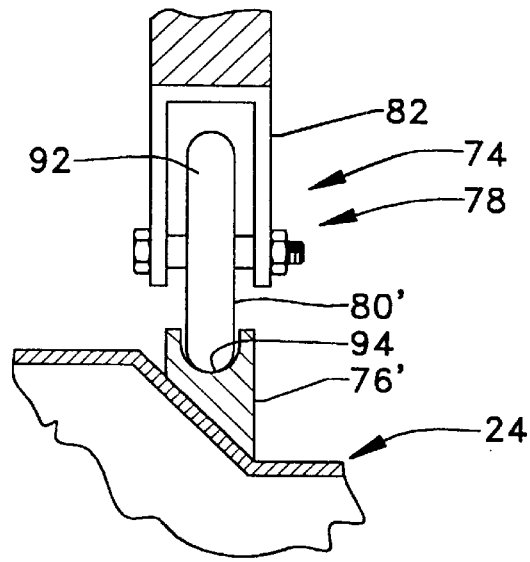
Fig_4_
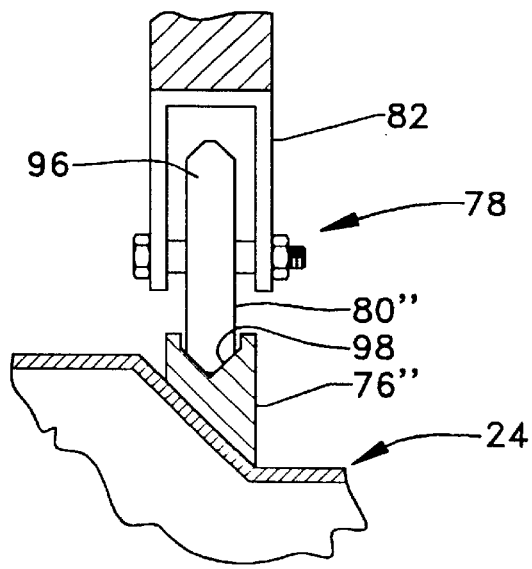
Fig_5_
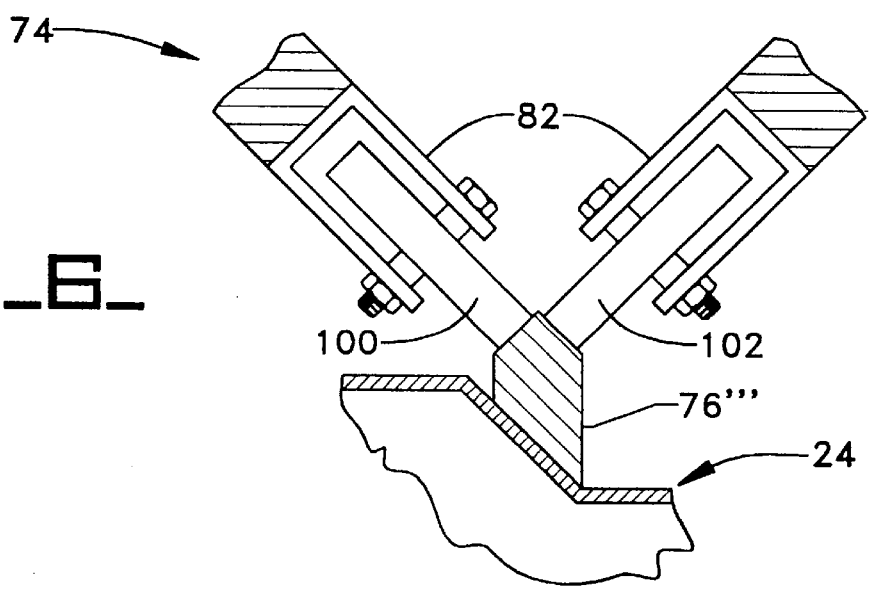
Fig_6_

SUPPORTING SYSTEM FOR A ROTATING CONCAVE GRAIN THRESHING MECHANISM

TECHNICAL FIELD

The present invention relates to a grain threshing mechanism and more particularly to a supporting system of a rotating concave grain threshing mechanism.

BACKGROUND ART

Rotating concave grain threshing systems are well known in the art and are a modern advancement in grain threshing mechanisms. These rotating concave grain threshing mechanism have a concave assembly and a rotor assembly positioned within a concave assembly. The rotor assembly is rotatable independent of rotation of the concave assembly. The rotation of the rotor and concave assemblies causes the grain and cut plant portions positioned in an annulus between the rotor and concave assemblies to be rolled and scrubbed, thereby separating, without cracking, the grain from the plant portion which has been cut and fed into the annulus. Often uneven crop density in the front portion of the threshing mechanism caused by uneven feeding of the crop causes radial unbalance of the threshing mechanism.

Farming currently involves very low profit margin products, so a major incentive exists for farmers to optimize their production operations and to maintain them at maximum efficiency. Efficiency of the combine is reduced when forward speed must be slowed to prevent clogging of the crop passing through the threshing mechanism.

Typically the concave threshing mechanism is supported by rollers at the front or intake end and by spoke members at the discharge end. The concave assembly is driven by a sprocket and chain mechanism adjacent the discharge end. Undesirably the sprocket members and drive mechanism are located in the path of discharge from the concave threshing mechanism causing clogging of the mechanism.

Problems associated with these heretofore utilized threshing mechanisms is more than a desirable numbers of parts, costs of these parts, labor and costs of parts replacement, and the space limitations of these mechanisms.

The present invention is directed to overcome one or more of the problems as set forth above.

DISCLOSURE OF THE INVENTION

In one aspect of the invention, a grain threshing mechanism has a rotatable concave assembly and a rotor assembly positioned within the concave assembly. The rotor assembly is rotatable independent of the concave assembly. The concave assembly has a receiving end portion, a discharge end portion, a middle portion and a supporting means for supporting and maintaining the concave assembly substantially coaxially aligned with the rotor assembly. The concave assembly receiving end portion is supported by the supporting means. The middle portion and discharge end portion of the concave assembly is cantilevered from the supporting means and free from supporting means and discharge obstruction.

BRIEF DESCRIPTION OF THE DRAWINGS

FIG. 1 is a simplified diagrammatic side view elevational view of a combine with a portion broken away to show a rotating grain threshing mechanism of this invention;

FIG. 2 is a diagrammatic enlarged cross-sectional view of the grain threshing mechanism with portions broken away to show the crop feed annulus, support means and drive system;

FIG. 3 is a diagrammatic cross-sectional view of the support means taken along lines 3—3 of FIG. 2;

FIG. 4 is a diagrammatic partial view of the supporting means of the concave assembly;

FIG. 5, is a diagrammatic partial view of another embodiment of the supporting means of the concave assembly; and FIG. 6 is a diagrammatic partial view of yet another embodiment of the supporting means of the concave assembly.

BEST MODE FOR CARRYING OUT THE INVENTION

Referring to FIGS. 1 and 2, a combine 10 has a header assembly 12 for receiving crops (not shown) which has been cut by a sickle 14. The cut crops fall into a crop feeding apparatus or feedhouse 16 in a conventional manner. The feedhouse 16 transports the cut crops from the header assembly 12 into a rotating concave threshing mechanism 18.

By the term rotating concave threshing mechanism 18, it is meant a threshing mechanism having a rotor assembly 22 positioned within a concave assembly 24 with the cut crop passing from the feedhouse 16 into an annulus 26 between the rotor assembly 22 and the concave assembly 24.

The rotor assembly 22 includes a generally cylindrical rotor 28 having a rotor inlet portion 30, a rotor middle portion 32, and a rotor outlet portion 34. The rotor inlet portion 30 includes a rotor frustoconical portion 36. The rotor 28 is mounted rigidly and coaxially on a first drive shaft 38 by a plurality of radially extending frame elements such as disk 40.

The concave assembly 24 includes a generally cylindrical concave 42 having a concave receiving end portion 44, a concave middle portion 46, a concave outlet portion 48, and a concave peripheral surface 50. The receiving end portion 44 includes a concave frustoconical portion 52.

A drive system 56 is connected to and associated with the concave assembly 24 for rotating the concave assembly 24 during the threshing operation. The drive system 56 includes a first pulley 58 connected to the outer peripheral surface 50 of the concave 42, a second pulley 60 connected to a second drive shaft 62 and an endless belt 64 encircling the pulleys. It is recognized that the drive system 56 could include a pair of sprockets and chain replacing the pulleys 58,60 and endless belt 64.

As best shown in FIG. 1, the first and second drive shafts 38 and 62 are connected to a hydraulic motor 66 which is operatively connected to a hydraulic pump 68 driven by a power source 70. It is recognized that the first and second shafts 38 and 62 could be driven by other suitable means such as a sprocket and an endless chain. The rotor assembly 22 is rotatable independently of the rotation of the concave assembly 24. The rotor assembly 22 maybe selectively rotated at approximately 300–500 RPM for larger grain such as corn, soybeans, etc. and selectively rotated at approximately 500–1000 RPM for small grain such as wheat, rice, oats grass seed, milo, flax, etc. The concave assembly 24 may be selectively rotated at approximately 50 RPM in the same or opposite direction as the rotor assembly 22.

As best shown in FIGS. 2 and 3, a supporting means 74 is provided for supporting and maintaining the concave assembly 24 substantially coaxially aligned with the rotor assembly 22.

The concave receiving end portion 44 of the grain threshing mechanism 18 is supported by the supporting means 74 and the concave middle portion 46 and the concave discharge end portion 48 of the threshing mechanism 18 is cantilevered and free from supporting means and discharge obstruction.

The supporting means 74 includes an annular rail 76 and a roller system 78 positioned adjacent the concave receiving end portion 44 and being spaced from the concave middle and discharge end portions 46, 48 of the threshing mechanism 18. In the preferred embodiment of FIG. 3, there are 3 circumferentially spaced apart separate rollers 80 associated with the concave 42 encompassing rail 76 for supporting the concave assembly 24. Each of the rollers 80 is rotatable supported on a bracket 82 connected to a frame portion 84 of the combine 10. Each of the rollers 80 have a concave outer peripheral surface 86 mateable with the rail 76 having a domed shaped peripheral surface 88.

As shown in FIGS. 4–6, the annular rail 76 and associated roller system 78 can be of various configurations. FIG. 4 shows a roller 80' of rounded outer periphery 92 mateable with a rail 76' having a rounded cavity 94. FIG. 5 shows a roller 80" having a tapered outer periphery 96 mateable with a rail 76" having a tapered cavity 98. It is recognized that the roller 80" could have a tapered cavity mateable with a rail 76" have a tapered outer periphery. FIG. 6 shows a tapered rail 76''' associated with opposed contacting rollers 100, 102. Each of the various rail and roller systems provide radial and axial support for the concave assembly 24.

The longitudinal length of the concave receiving end portion 44 is less than half the total longitudinal length of the concave assembly 24. More preferably, the longitudinal length of the concave receiving end portion 44 is generally one-third the total longitudinal length of the rotating concave threshing assembly 24. Owing to the harsh environment in which the rotating concave threshing system mechanism 18 operates, it is desirable for efficient operation and to prevent clogging of the mechanism that the supporting means 74 be removed from the discharge end 48 of the mechanism. With no obstruction of support structure etc. from the annulus 26 between the concave assembly 24 and rotor assembly 22 the material passes freely from the concave assembly 18.

The supporting means 74 is optimally placed as far from the discharge end as possible and at the point of uneven crop density in the receiving end portion 44 of the concave assembly 24. It has been found that one skilled in the art can easily determine the general center of gravity of the threshing mechanism 18 including the general weight of the crop material being processed thereby. Although the crop material will be of uneven distribution adjacent the receiving end portion 44 of the concave; ie, the annulus 26 between the concave assembly 24 and the rotor assembly 22, the density of the crop material adjacent the middle and discharge end portions 46, 48 of the concave assembly 24 will be generally uniform. Therefore, the supporting means 74 is preferably positioned on the receiving end portion 44 of the concave assembly 24 at about the point of unbalance as calculated relative to the unit weight of crops expected to be harvested.

INDUSTRIAL APPLICABILITY

In the construction of the apparatus of this invention, the concave assembly 24 of the rotating threshing mechanism 18 is supported at a location spaced from the middle and discharge end portions 46, 48 of the concave assembly 24. The middle and discharge end portions 46, 48 of the concave assembly 24 are thereby cantilevered and free from supporting means and discharge obstruction.

Such construction reduces the number of parts of the rotating concave threshing mechanism 18 which represents a savings of labor, time, material and natural resources. Further, there is realized a savings of labor and harvested grain owing to the increased efficiency of the concave threshing mechanism 18 realized by dramatically reducing obstruction at the discharge end of the threshing mechanism 18.

Other aspects objects and advantages of this invention can be obtained from a study of the drawings, the disclosure and the appended claims.

I claim:

1. In a grain threshing mechanism having a rotatable concave assembly and a rotor assembly positioned within the concave, said rotor assembly being rotatable independently of the rotation of the concave assembly, said concave assembly having a concave receiving end portion, a concave middle portion, a concave discharge end portion, and support structure which supports and maintains said concave assembly substantially coaxially aligned with said rotor assembly, the improvement wherein:

said concave receiving end portion is supported directly by said support structure, and said concave middle portion and said concave discharge end portion are cantilevered from said support structure and free from discharge obstruction.

2. A grain threshing mechanism, as set forth in claim 1, wherein said grain threshing mechanism includes a driving system connected to and being adapted to rotate said concave assembly.

3. A grain threshing mechanism, as set forth in claim 2, wherein said drive system is positioned behind said concave receiving end portion.

4. A grain threshing mechanism, as set forth in claim 3, wherein said drive system is positioned along said concave middle portion adjacent said rail and roller system.

5. A grain threshing mechanism, as set forth in claim 1, wherein the longitudinal length of the concave receiving end portion is generally one-third the total longitudinal length of the concave assembly.

6. A grain threshing mechanism, as set forth in claim 1, wherein the supporting means is positioned along the receiving end portion of the concave at about the operating longitudinal center of gravity of the concave and rotor assembly as calculated in conjunction with the unit weight of crops expected to be harvested.

7. A grain threshing mechanism, as set forth in claim 1, wherein said supporting means includes a rail and roller system positioned along the concave receiving end portion and away from the concave middle and concave discharge end portions.

8. A grain threshing mechanism, as set forth in claim 7, wherein the roller system includes a roller having a concave outer periphery mateable with a rail having a domed shaped periphery.

9. A grain threshing mechanism, as set forth in claim 7, wherein the roller system includes a roller having a rounded outer periphery mateable with a rail having a rounded cavity.

10. A grain threshing mechanism, as set forth in claim 7, wherein the roller system includes a roller having a tapered outer periphery mateable with a rail having a tapered cavity.

11. A grain threshing mechanism, as set forth in claim 7, wherein a tapered rail is associated with a pair of opposed contacting rollers.

12. A grain threshing mechanism, as set forth in claim 7, wherein the roller system includes a plurality of circumferentially spaced apart rollers.

13. A grain threshing mechanism, as set forth in claim 1, wherein said concave middle portion and said concave discharge end portion are substantially free from support structure.

* * * * *